US012749947B2

(12) United States Patent
Kuebler et al.

(10) Patent No.: US 12,749,947 B2
(45) Date of Patent: Sep. 29, 2026

(54) MACHINE COOLING CIRCUIT OF AN ELECTRIC MACHINE, OVERALL COOLING CIRCUIT OF A MOTOR VEHICLE, AND MOTOR VEHICLE

(71) Applicant: Dr. Ing. h.c. F. Porsche Aktiengesellschaft, Stuttgart (DE)

(72) Inventors: Simon Kuebler, Untergruppenbach Unterheinriet (DE); Stefan Oechslen, Stuttgart (DE); Thomas Lenz, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 247 days.

(21) Appl. No.: 18/520,631

(22) Filed: Nov. 28, 2023

(65) Prior Publication Data

US 2024/0186866 A1 Jun. 6, 2024

(30) Foreign Application Priority Data

Dec. 2, 2022 (DE) ..................... 10 2022 132 051.0

(51) Int. Cl.
*H02K 9/193* (2006.01)
*H02K 9/26* (2006.01)
*B60K 11/02* (2006.01)

(52) U.S. Cl.
CPC ............... *H02K 9/193* (2013.01); *H02K 9/26* (2013.01); *B60K 11/02* (2013.01)

(58) Field of Classification Search
CPC .......... H02K 9/193; H02K 9/26; H02K 9/197; H02K 9/19; H02K 9/24; B60K 11/02; B60K 1/00; B60K 2001/003; B60K 2001/006; F01P 11/028; F01P 11/029
USPC .......................................................... 310/54
See application file for complete search history.

(56) References Cited

U.S. PATENT DOCUMENTS

| | | | | |
|---|---|---|---|---|
| 6,230,546 | B1 | 5/2001 | Wilstermann et al. | |
| 2021/0001714 | A1* | 1/2021 | Oechslen ............... | B60K 11/02 |

FOREIGN PATENT DOCUMENTS

| | | | |
|---|---|---|---|
| DE | 102008019227 | A1 | 10/2009 |
| DE | 102019126914 | A1 | 4/2021 |
| DE | 102020001062 | A1 | 8/2021 |
| DE | 102020114381 | A1 | 12/2021 |
| DE | 102021110135 | B3 | 8/2022 |
| DE | 102021203301 | A1 | 10/2022 |
| EP | 0922498 | A1 | 6/1999 |
| WO | WO 2012068102 | A2 | 5/2012 |

(Continued)

OTHER PUBLICATIONS

DE102021110135B3 English translation (Year: 2025).*

(Continued)

*Primary Examiner* — Christopher M Koehler
*Assistant Examiner* — Viswanathan Subramanian
(74) *Attorney, Agent, or Firm* — LEYDIG, VOIT & MAYER, LTD.

(57) ABSTRACT

A machine cooling circuit of an electric machine of a motor vehicle, including a coolant adapted to flow through the machine cooling circuit and a compensating reservoir, which separates air included in the coolant. The electric machine is a directly cooled electric machine, which is accommodated in the machine cooling circuit such that the coolant flows through it.

16 Claims, 4 Drawing Sheets

(56) References Cited

FOREIGN PATENT DOCUMENTS

| | | | |
|---|---|---|---|
| WO | WO 2021235990 | A1 | 11/2021 |
| WO | WO 2021235991 | A1 | 11/2021 |

OTHER PUBLICATIONS

DE102019126914A1 English translation (Year: 2025).*
DE102020114381A1 English translation (Year: 2026).*
DE102020001062A1 English translation (Year: 2026).*

* cited by examiner

MACHINE COOLING CIRCUIT OF AN ELECTRIC MACHINE, OVERALL COOLING CIRCUIT OF A MOTOR VEHICLE, AND MOTOR VEHICLE

CROSS REFERENCE TO RELATED APPLICATIONS

This application claims benefit to German Patent Application No. DE 10 2022 132 051.0, filed on Dec. 2, 2022, which is hereby incorporated by reference herein.

FIELD

The invention relates to a machine cooling circuit of an electric machine, an overall cooling circuit of a motor vehicle, and to a motor vehicle.

BACKGROUND

It is known to cool electric machines, in particular for drive units of motor vehicles, wherein cooling can be performed in different ways. For example, a conventionally low-viscosity coolant can be conducted through grooves of the electric machine, wherein the coolant flows completely around windings located in the grooves. In this case, the coolant is conducted from one end of the electric machine to the other end of the electric machine. High flow rates are present in the area of connecting pieces via which the coolant is introduced and discharged, but lower flow rates are present opposite the connecting pieces and have a disadvantageous effect on heat transfer. Likewise, coolant can only wash around winding heads of the windings. In the two cases mentioned, a rotor chamber, which accommodates a rotor of the electric machine, is sealed, e.g. with the aid of a rotor can, against a stator chamber, which accommodates a stator of the electric machine. Alternatively, the electric machines in electric vehicles can be designed with what is referred to as water jacket cooling, in which case a water-glycol mixture, which absorbs and dissipates the heat caused by the losses, is conventionally conducted on a stator back with the aid of a cooling jacket.

DE 10 2020 001 062 A1 discloses a cooling circuit of a traction battery, which is equipped with a special compensating reservoir. This compensating reservoir has a mechanical piston element, which can generate positive pressure by means of a spring in order to adjust the system pressure in the cooling circuit.

Known from WO 2012/068102 A2 is a cooling circuit of a diesel combustion engine is known, in which the cooling circuit is filled while applying a vacuum in order to avoid air bubbles.

DE 10 2020 114 381 A1 discloses a cooling circuit of a motor vehicle that can be driven at least partially electrically, in which the cooling circuit has a compensating reservoir with an active pressure control unit, which can purposefully increase the pressure in the compensating reservoir by means of a compressor. With the aid of the pressure adjustment, cavitation in the compressor is to be counteracted.

DE 10 2008 019 227 A1 discloses a system for adjusting a fill level of a compensating reservoir of a cooling circuit of an internal combustion engine as a function of a temperature expansion of a coolant. The fill level is purposefully raised during the warm-up phase in order to generate a higher pressure and to counteract the risk of cavitation.

Known from WO 2021/235990 A2 and WO 2021/235991 A2 is a cooling circuit for an electrified vehicle is known, which comprises an apparatus for separating air bubbles from the cooling liquid, in addition to a compensating reservoir.

EP 922 498 A1A discloses a cooling circuit of an electric vehicle, in which the cooling circuit is filled with coolant while applying a vacuum.

SUMMARY

In an embodiment, the present disclosure provides a machine cooling circuit of an electric machine of a motor vehicle, comprising a coolant adapted to flow through the machine cooling circuit and a compensating reservoir, which separates air included in the coolant. The electric machine is a directly cooled electric machine, which is accommodated in the machine cooling circuit such that the coolant flows through it.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
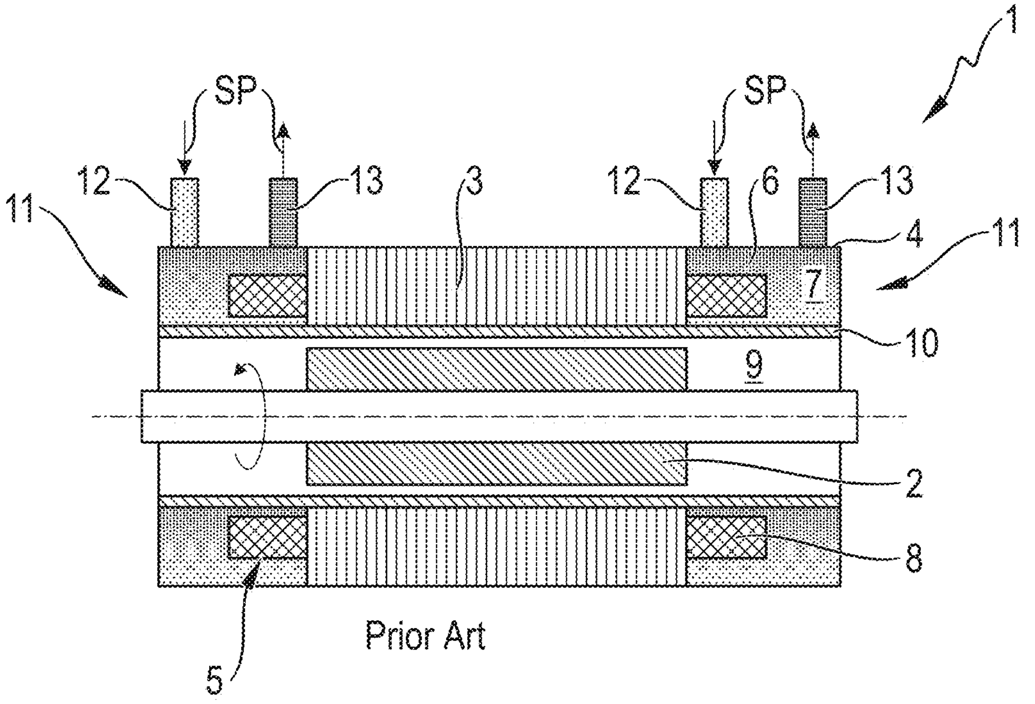
FIG. 1 illustrates a schematic representation of the electric machine according to the prior art.

In an embodiment, the present invention provides an improved machine cooling circuit of an electric machine of a motor vehicle. Embodiments of the invention also provide an improved overall cooling circuit for a motor vehicle as well as an improved motor vehicle.

A first aspect of the invention relates to a machine cooling circuit of an electric machine of a motor vehicle, wherein the machine cooling circuit comprises a coolant capable of flowing through the machine cooling circuit, and wherein a compensating reservoir, which is used to separate air entrained in the coolant, is accommodated in the machine cooling circuit. According to an embodiment of the invention, the electric machine is a directly cooled electric machine, which is accommodated in the machine cooling circuit such that the coolant can flow through it. The advantage is that the electric machine can be accommodated directly in the machine cooling circuit, and the coolant can cool the electric machine directly so that effective and direct cooling of the electric machine can be achieved. The coolant can cool the individual components of the electric machine and can electrically insulate current-carrying components from one another.

In an embodiment of the machine cooling circuit according to the invention, the electric machine comprises a housing, in which a rotor is rotatably accommodated in a rotor chamber and in which a stator and a winding are accommodated in a stator chamber, the stator chamber being separated from the rotor chamber and coolant of the machine cooling circuit at least being able to partially flow around the stator and the winding. The advantage of the machine cooling circuit formed with this electric machine can be seen in that, due to the structure of the electric machine and its separation of the rotor chamber and the stator chamber, preferably in particular with the aid of a rotor can, heat development in the electric machine is reduced since the rotor is not exposed to coolant.

In an embodiment of the machine cooling circuit according to the invention, the latter is a self-deaerating cooling circuit. In other words, deaeration or venting of the machine cooling circuit is performed using independently active means. In particular, the machine cooling circuit is a closed self-deaerating cooling circuit. A machine cooling circuit that reliably has no air bubbles or a reduced amount of air bubbles can thereby be advantageously achieved. Or, in other words, air entrained in the coolant is advantageously eliminated or reduced to a non-critical level.

For example, entrained air can already be present in the machine cooling circuit during an assembly and filling process. In addition, air in the form of air bubbles can be introduced into the coolant by a conveyance means, conventionally preferably in the form of a pump, and/or by the compensating reservoir, in particular during dynamic driving conditions of the vehicle. These air bubbles can, e.g., collect on what are referred to as hydraulic undercuts, or be conducted back to the compensating reservoir via the machine cooling circuit.

In all cases, air in the machine cooling circuit results in a reduction in the effectiveness of the heat transfer between a body around or through which coolant flows and the coolant flowing around or through the body. It can also lead to a reduction in an electrical insulation property of the coolant. Air can also increase a risk of local and temporary partial discharges, which damage the coolant. The air must therefore be reliably removed from the machine cooling circuit completely or down to a non-critical level, as can be achieved using the machine cooling circuit according to an embodiment of the invention.

Advantageously, the machine cooling circuit according to an embodiment of the invention thus comprises a force-loaded or pressure-loaded compensating reservoir, with the aid of which pressure can advantageously be exerted on the coolant so that the latter cannot experience any expansion and thus cannot include any air. Or, a microbubble separator is arranged in the machine cooling circuit. The advantage of the microbubble separator is that, due to circulation and recirculation of the coolant, gas bubbles are reduced in size in a conveyance means, in particular in the form of a pump, conventionally formed in the machine cooling circuit and can be further reduced in size and in part dissolved again depending on the temperature level. However, these gas bubbles are still contained in the system and re-form, e.g., on a heat source since gas solubility decreases with increasing temperature. The bubbles typically form on cavitation seeds, small contaminants of the coolant or also porous materials and flow deflections with corresponding pressure drop. The microbubble separator assists in the formation of small bubbles while allowing them to be collected, ideally agglomerated, and conducted out of the cooling medium via an automatic deaeration means. The microbubble separator should ideally be placed directly downstream of a heat source since the bubble concentration is the highest there and, due to the boundary conditions, the medium tends to readily separate further bubbles, which can then be purposefully removed.

The force-loaded or pressure-loaded compensating reservoir can also be arranged in combination with the microbubble separator in the machine cooling circuit. Likewise, the coolant can be received in the form of a degassed fluid in the machine cooling circuit.

It has proven advantageous to arrange an additional conveyance means formed in the machine cooling circuit upstream of a filter element formed in the machine cooling circuit and downstream of a further heat exchanger formed in the machine cooling circuit.

The coolant in the machine cooling circuit is advantageously a dielectric fluid, since it comes into contact with current-carrying components of the electric machine. Furthermore, it is advantageously an insulation medium.

With the aid of the machine cooling circuit according to an embodiment of the invention, introduction of air into the machine cooling circuit can be reliably prevented or reduced to a non-critical level so that improvement with respect to thermal, reliability and robustness is brought about.

A second aspect of the invention relates to an overall cooling circuit of a motor vehicle, wherein the overall cooling circuit comprises a first cooling circuit for cooling at least one pulse inverter and a second cooling circuit for cooling a transmission of the motor vehicle. According to an embodiment of the invention, the overall cooling circuit comprises a machine cooling circuit.

Advantageously, flow can take place through the three cooling circuits of the overall cooling circuit—the first cooling circuit, the second cooling circuit and the machine cooling circuit—separately from one another so that various coolants can advantageously be used. Thus, in the first cooling circuit, the coolant in the form of a water-glycol mixture can advantageously be used, in particular for cooling the pulse inverter. A transmission can be advantageously cooled and lubricated with a coolant in the form of a transmission oil. The machine cooling circuit in which the electric machine is arranged can advantageously have the coolant in the form of the dielectric fluid.

A further conveyance means of the second cooling circuit and an additional conveyance means of the machine circuit are advantageously designed in the form of a tandem pump. In other words, the two conveyance means are coupled such that they can be operated with one another. Doing so leads to a total cooling circuit that is optimized in terms of installation space and has reduced energy demand.

Advantageously, for designing the overall cooling circuit for heat absorption and heat dissipation in an optimized manner in terms of installation space, the first cooling circuit is thermally coupled to the second cooling circuit with the aid of a heat exchanger of the overall cooling circuit, and/or the machine cooling circuit is thermally coupled to the first cooling circuit with the aid of a further heat exchanger of the overall cooling circuit. The coolant of the first cooling circuit in the form of the water-glycol mixture can thus advantageously flow through a heat exchanger of the machine cooling circuit and a heat exchanger of the second cooling circuit and is in particular cooled again in a cooler of the first cooling circuit.

A third aspect of the invention relates to a motor vehicle, in which case the motor vehicle comprises an electric machine for propulsion and is formed with an overall cooling circuit. The advantages of a directly cooled electric machine can thus be utilized in a simple manner.

Additional advantages, features, and details of embodiments of the invention arise from the following description of preferred exemplary embodiments, as well as with reference to the drawings. The features and feature combinations specified hereinabove in the description, as well as the features and feature combinations mentioned hereinafter in the description of the drawings and/or shown alone in the drawings, can be used not only in the respectively specified combination, but also in other combinations, or on their own, without departing from the scope of the invention. Identical or functionally identical elements are assigned identical reference signs.

An electric machine 1 for a motor vehicle according to the prior art has a structure, as shown in FIG. 1. The electric machine 1 comprises a rotor 2 and a stator 3 arranged so as to comprise the rotor 2. The present electric machine 1 is designed in the form of what is referred to as an inner rotor, wherein the rotor 2 is rotatably mounted relative to the stator 3 in a housing 4 of the electric machine 1 with the aid of bearings. Windings 5 for generating a magnetic field are arranged in grooves of the stator 3. The stator 3 and the winding 5 are accommodated in a stator chamber 6 of the housing 4, the stator chamber 6 being designed so that flow can take place through it.

During operation of the electric machine 1, a stator lamination pack of the stator 3 and, in particular, the winding 5 heat up and must be cooled. For this purpose, coolant 7 flows through the stator chamber 6, wherein a flow of the coolant 7, as indicated by flow arrows SP, can be formed to a limited extent in the area of winding heads 8 of the winding 5, as illustrated in FIG. 1, or the coolant 7 can flow around the stator 3 and the winding 5 completely in the axial direction of the electric machine 1 and thus cool them. For this purpose, the electric machine 1 is designed according to FIG. 2, which illustrates the electric machine 1 according to the prior art in a variant. The electric machine 1 shown in FIGS. 1 and 2 is designed as what is referred to as a directly cooled electric machine 1 since coolant 7 can flow at least partially directly around the stator 3 and the winding 5.

In order to avoid the coolant 7 passing from the stator chamber 6 into a rotor chamber 9 of the electric machine 1, in which the rotor 2 is accommodated, the stator chamber 6 and the rotor chamber 9 are designed to be separated from one another with the aid of a rotor can 10. In other words, the stator chamber 6, which can also be referred to as the wet chamber, is separated from the rotor chamber 9, which can also be referred to as the dry chamber, with the aid of the rotor can 10.

Figure 2:
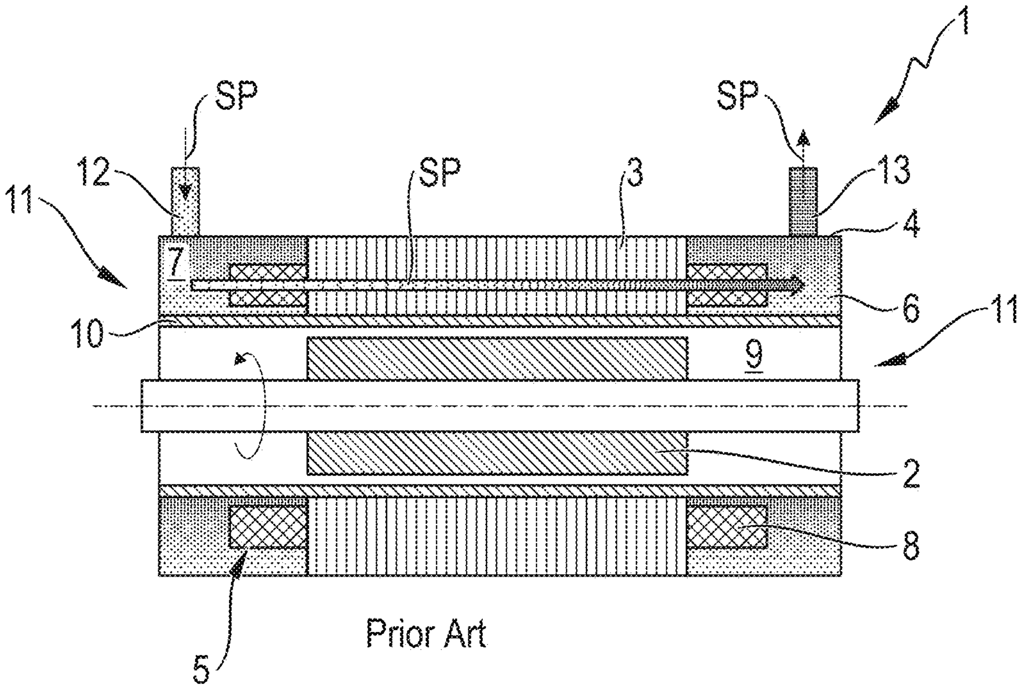
FIG. 2 illustrates a schematic representation of the electric machine according to the prior art in a variant.

The electric machine 1 according to the prior art shown in FIG. 1 has a coolant inlet 12 and a coolant outlet 13 at each of its axial end regions 11, whereas the electric machine 1 according to the prior art according to FIG. 2, thus in the variant of the prior art, has the coolant inlet 12 at one of the two end regions 11 and the coolant outlet 13 at the other of the two end regions 11. Likewise, the coolant inlet 12 could also be arranged diametrically opposite the coolant outlet 13. The winding heads 8 of the winding 5 are therefore situated in the stator chamber 6 so that flow takes place around them.

Figure 3:
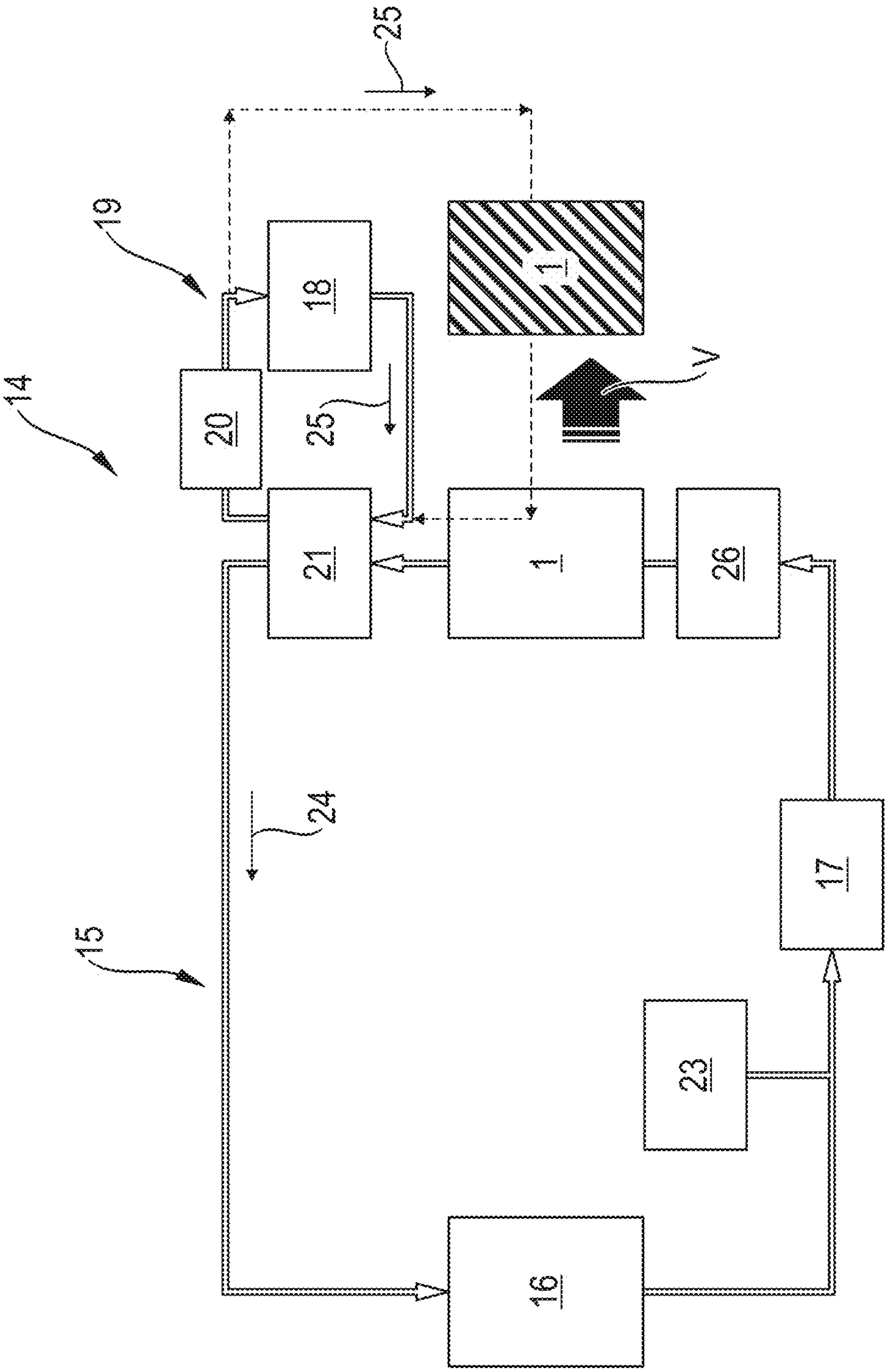
Prior Art Fig. 3
FIG. 3 illustrates a schematic representation of an overall cooling circuit of a motor vehicle according to the prior art in three variants.

FIG. 3 shows three variants of an overall cooling circuit 14 of the motor vehicle according to the prior art in a schematic representation. The overall cooling circuit 14 of the motor vehicle comprises a first cooling circuit 15, through which a further coolant 24 in the form of a water-glycol mixture flows and which has a cooler 16 in the form of an air-water cooler. Arranged downstream of the cooler 16 is a conveyance means 17 in the first cooling circuit 15, whereby the electric machine 1 according to the first variant of the overall cooling circuit 14 (indicated in FIG. 3 by a solid line) is accommodated in the first circuit portion 15 in order to be cooled. A pulse inverter 26 is furthermore accommodated in the first cooling circuit 15.

For cooling a transmission 18 of the motor vehicle, the overall cooling circuit 14 comprises a second cooling circuit 19, through which a transmission oil as an additional coolant 25 flows. This second cooling circuit 19 comprises a further conveyance means 20 upstream of the transmission 18. A heat exchanger 21 in the form of an oil-water heat exchanger is formed between the transmission 18 and the further conveyance means 20, the heat exchanger 21 forming a thermal connection between the first cooling circuit 15 and the second cooling circuit 19 and heat absorbed by the additional coolant 25 being delivered to the further coolant 24.

The overall cooling circuit 14 according to the second variant of the overall cooling circuit 14 comprises a flow through the rotor 2 of the electric machine 1 by the additional coolant 25, the rotor 2 thus being accommodated in the second cooling circuit 19 (as schematically illustrated by a dashed line).

The overall cooling circuit 14 according to the third variant comprises the electric machine 1 accommodated in the second cooling circuit 19 only. In other words, the electric machine 1 is only cooled by the additional coolant 25. For the sake of clarity, this is shown with the aid of the shaded electric machine 1 and a transfer arrow V, which indicates the transfer of the electric machine 1 from the first cooling circuit 15 into the second cooling circuit 19.

In order to reduce possible air bubbles in the first cooling circuit 15, a two-phase compensating reservoir 23 is accommodated in the overall circuit 14 according to the prior art upstream of the conveying means 17 and downstream of the cooler 16.

Figure 4:
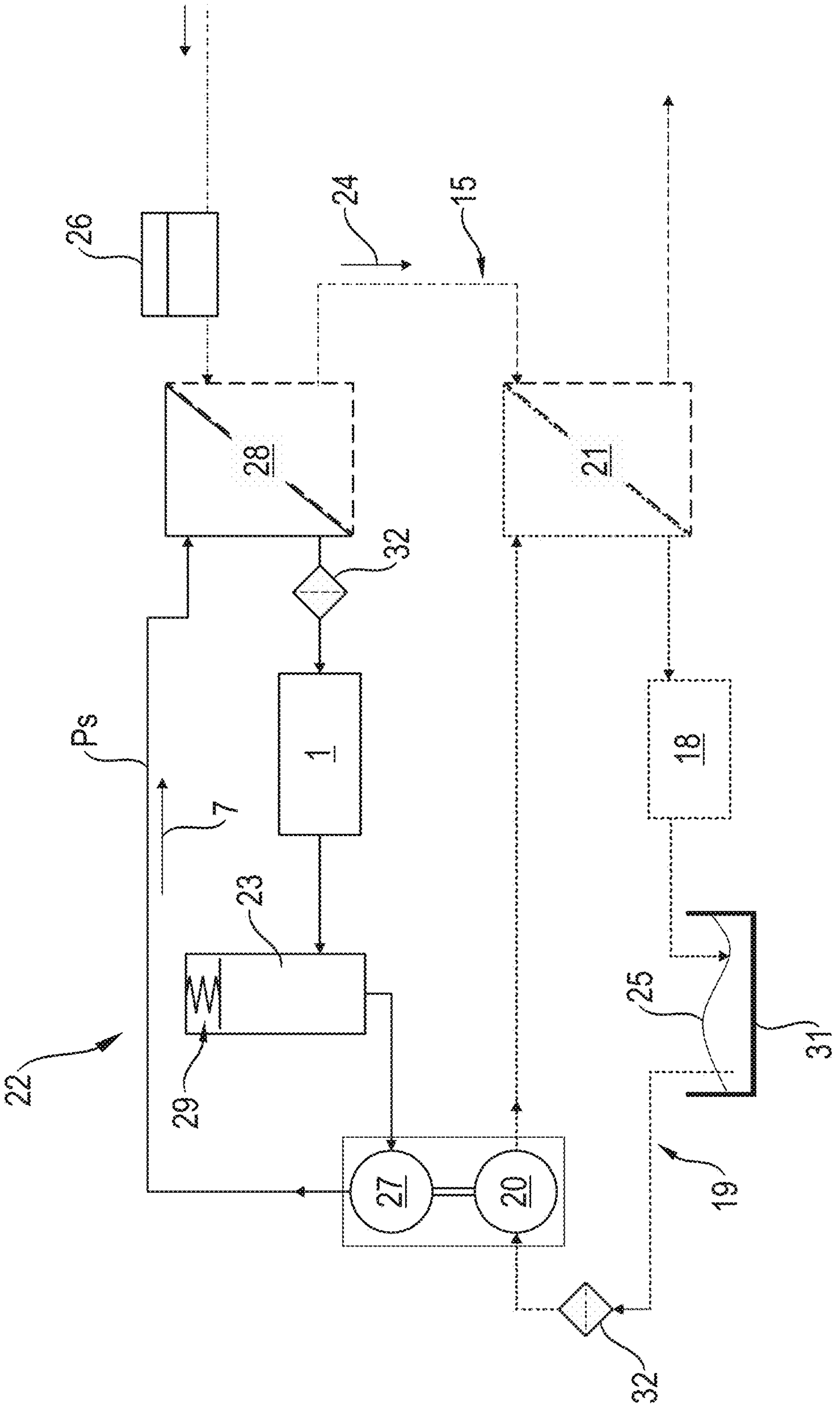
FIG. 4 illustrates a schematic representation of an overall cooling circuit according to an embodiment of the invention.
Figure 5:
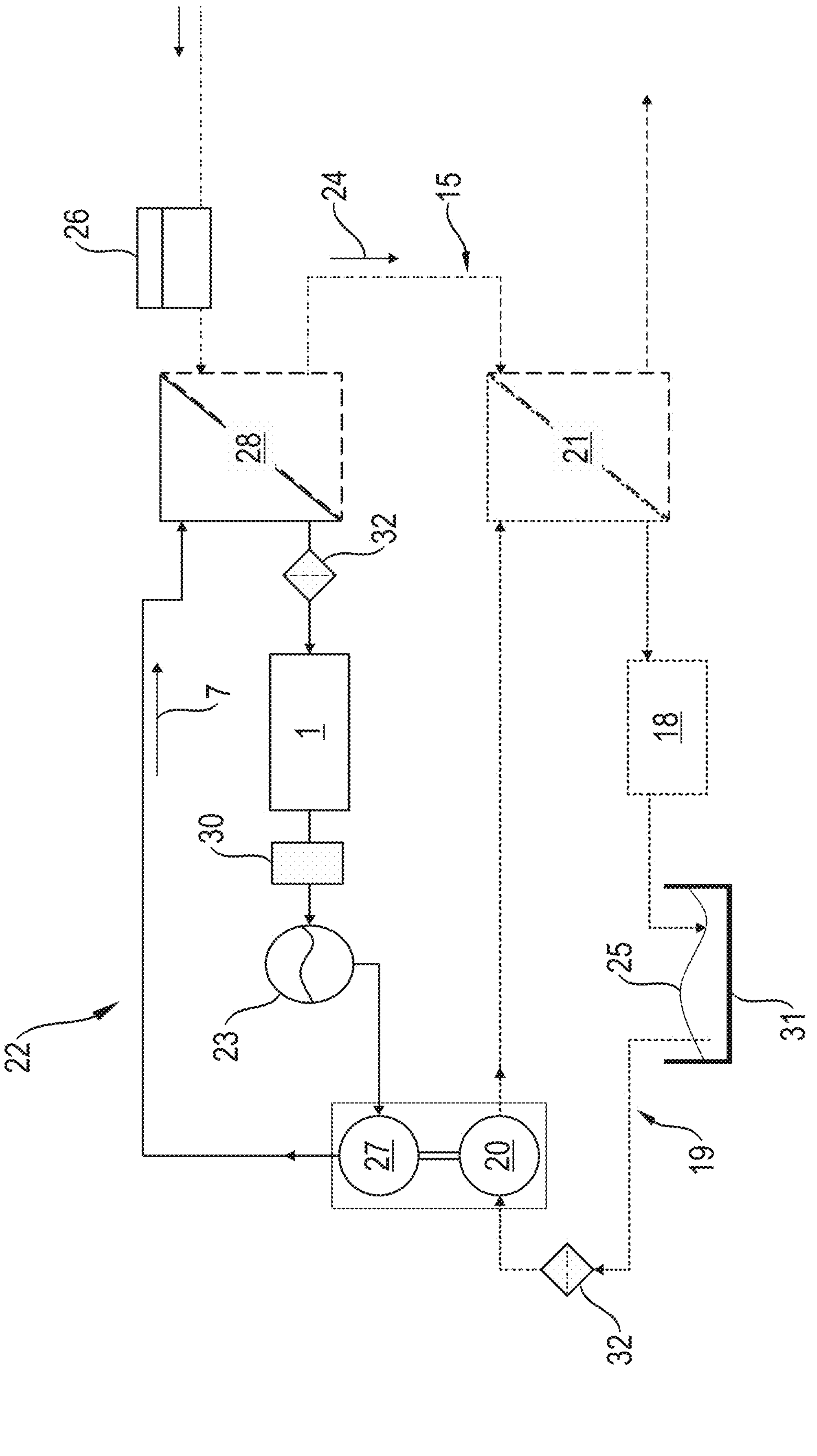
FIG. 5 illustrates a schematic representation of the overall cooling circuit according to an embodiment of the invention.

In FIG. 4, in a schematic representation, an overall cooling circuit 14 according to an embodiment of the invention is illustrated with a machine cooling circuit 22 according to an embodiment of the invention of the electric machine 1 of the motor vehicle in a first exemplary embodiment. The machine cooling circuit 22 according to an embodiment of the invention is characterized in that it is designed to accommodate the electric machine 1 in the form of the directly cooled electric machine 1 such that the coolant 7 can flow through it. It is indicated in FIGS. 4 and 5 by a solid line.

The machine cooling circuit 22 is formed virtually independently of the first cooling circuit 15 and the second cooling circuit 19 or, in other words, is designed to be flow-independent of the two cooling circuits 15, 19. In other words, the overall cooling circuit 14 according to an embodiment of the invention comprises three cooling circuits 15, 19, 22, each of which can be flowed through separately from one another by coolant 7, 24, 25. An advantage of this separation is a use of different coolants 7, 24, 25, which can each take into account the corresponding components arranged in the respective cooling circuit 15, 19, 22. For example, it is advantageous to design the coolant 7 flowing through the machine cooling circuit 22 in the form of the dielectric fluid, whereas the water-glycol mixture is advantageous as a further coolant 24 in the first cooling circuit 15 and the transmission oil is advantageous as an additional coolant 25 in the second cooling circuit 19.

A thermal coupling between the first cooling circuit 15 (indicated in FIGS. 4 and 5 by a dashed line), the second cooling circuit 19 (indicated in FIGS. 4 and 5 by a finely dashed line), and the machine cooling circuit 22 is performed by the heat exchanger 21 and a further heat exchanger 28, whereby the further heat exchanger 28 achieves the thermal coupling between the first cooling circuit 15 and the machine cooling circuit 22, whereas the heat exchanger 21 is provided for the thermal coupling of the first cooling circuit 15 and the second cooling circuit 19.

In the machine cooling circuit 22, the compensating reservoir 23 is arranged, in which case the latter is, e.g., provided downstream of the electric machine 1 and upstream of an additional conveyance means 27, which is provided for the recirculation of the coolant 7 located in the machine cooling circuit 22. The additional conveying means 27 and the further conveying means 20 are designed in the form of what is referred to as a tandem pump. The machine cooling circuit 22 thus substantially comprises the directly cooled electric machine 1, the additional conveyance means 27, the further heat exchanger 28 and the compensating reservoir 23.

The compensating reservoir 23 is force-loaded or pressure-loaded, e.g. with the aid of a spring element 29, with the aid of which a system pressure $p_s$ of the machine cooling circuit 22 is controlled. The spring element 29 exerts a force on the coolant 7, which is thus impeded in its expansion, and air bubbles cannot be formed or cannot be formed to any significant extent. In other words, the machine cooling circuit 22 according to the first exemplary embodiment features a system pressure $p_s$ such that air bubble formation is eliminated or insignificant. This furthermore means that, in principle, the system pressure $p_s$ is a minimum pressure which is to be maintained or, in other words, which is continuously applied in the machine circuit 22.

For this purpose, a fill level of the compensating reservoir 23 can be monitored and a possible coolant loss can thus be diagnosed. Likewise, the fill level can be utilized in combination with a special control of the additional conveyance means 27 to determine gas bubble entrapments. The minimum pressure is dependent on a composition of the coolant 7.

In the closed machine cooling circuit 22, the force-loaded or pressure-loaded compensating reservoir 23 thereby represents a self-deaerating element in the machine cooling circuit 22.

The compensating reservoir 23 is intended to be arranged remotely from possible heat sources in order to prevent bubble formation. It is furthermore provided that, due to longitudinal and lateral accelerations occurring during operation of the motor vehicle, independent and reliable self-deaeration of the compensating reservoir 23 can be performed along a wide operating range of the motor vehicle.

The force-loaded or pressure-loaded compensating reservoir 23 is preferably arranged in an inlet of the additional conveyance means 27 in order to minimize possible cavitation.

In one exemplary embodiment, the machine cooling circuit 22 according to an embodiment of the invention shown in FIG. 4 is filled with coolant 7, which is present in the form of a degassed fluid. For example, oils with 8% to 10% have a high capacity to dissolve air, in comparison to a cooling water, the capacity of which is 3% to 4%. In the event of a previous degassing in combination with a vacuum filling at a system pressure $p_s$, which has a value of less than 10 mbar absolute before filling, oils thus offer the possibility of reliably keeping residual air in the coolant 7 at an amount of approximately 1%. This leads to the closed machine cooling circuit 22, which can be reliably operated without bubbles, under the precondition of preventing leakage-related air ingress, of course.

The overall cooling circuit 14 according to a second exemplary embodiment illustrated in a schematic representation in FIG. 5 comprises, in addition to the compensating reservoir 23, a microbubble separator 30 in the machine cooling circuit 22 according to an embodiment of the invention, said microbubble separator being arranged, by way of example, between the electric machine 1 and the compensating reservoir 23 in the machine cooling circuit 22. The microbubble separator 30 assists in the formation of small bubbles while enabling them to be collected, ideally agglomerated, and removed from the coolant 7 via an automatic deaeration means. The microbubble separator 30 is preferably to be arranged directly downstream of a heat source since a bubble concentration is highest in that location, and the coolant 7 tends to readily separate further bubbles, which can then be removed in a target manner.

A further machine cooling circuit 22 according to an embodiment of the invention comprises the force-loaded or pressure-loaded compensating reservoir 23, as explained in the first exemplary embodiment, wherein the microbubble separator 30 is additionally accommodated in the machine cooling circuit 22. In the machine cooling circuit 22 according to the second exemplary embodiment, the microbubble separator 30 thereby represents the self-deaerating element in the closed machine cooling circuit 22. Likewise, this machine cooling circuit 22 could also be filled with coolant 7 in the form of the degassed fluid.

Optionally, the second cooling circuit 19 and the machine cooling circuit 22 each comprise a filter element 32 for filtering the coolant 7, 25, wherein the filter element 32 in the second cooling circuit 19 is advantageously arranged downstream of a coolant reservoir 31 of the second cooling circuit 19.

Of course, the machine cooling circuit 22 according to an embodiment of the invention comprises the directly cooled machine 1 with the coolant 7 flowing through it in the direction of the flow arrow SP, as shown in FIG. 1 or shown in FIG. 2. In particular in the case of a complete axial flow-through by the coolant 7 as illustrated in FIG. 2, possible air bubble formation can occur in the area between the stator 3 and the winding heads 8 due to hydraulic undercuts and is eliminated with the aid of the machine cooling circuit 22 according to an embodiment of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electric machine
2 Rotor
3 Stator
4 Housing
5 Winding
6 Stator chamber
7 Coolant
8 Winding head
9 Rotor chamber
10 Rotor can
11 End region
12 Coolant inlet
13 Coolant outlet
14 Overall cooling circuit
15 First cooling circuit
16 Cooler
17 Conveying means
18 Transmission
19 Second cooling circuit
20 Further conveyance means
21 Heat exchanger
22 Machine cooling circuit
23 Compensating reservoir
24 Further coolant
25 Additional coolant
26 Pulse inverter
27 Additional conveyance means
28 Further heat exchanger
29 Spring element
30 Microbubble separator
31 Coolant reservoir
32 Filter element
SP Flow arrow
V Transfer arrow
$p_s$ System pressure

The invention claimed is:

1. A machine cooling circuit of an electric machine of a motor vehicle, comprising:
a coolant adapted to flow through the machine cooling circuit;
a compensating reservoir that is force-loaded or pressure-loaded such that the force-loading or pressure-loading separates air entrained in the coolant from the coolant; and
a conveyance means formed in the machine cooling circuit arranged downstream of a filter element formed in the machine cooling circuit relative to a heat exchanger and upstream of the heat exchanger formed in the machine cooling circuit relative to the filter element,
wherein the electric machine is a directly cooled electric machine, which is accommodated in the machine cooling circuit such that the coolant flows through the electric machine,
wherein a microbubble separator is arranged in the machine cooling circuit, and
wherein the conveyance means of the machine cooling circuit is configured as a tandem pump with a second conveyance means of a transmission cooling circuit.

2. The machine cooling circuit according to claim 1, wherein the electric machine comprises a housing, in which a rotor is rotatably accommodated in a rotor chamber and in which a stator and a winding are accommodated in a stator chamber,
wherein the stator chamber is separated from the rotor chamber, and
wherein the coolant of the machine cooling circuit can at least partially flow around the stator and the winding.

3. The machine cooling circuit according to claim 1, wherein the machine cooling circuit is a self-deaerating cooling circuit.

4. The machine cooling circuit according to claim 3, wherein the machine cooling circuit is a closed, self-deaerating cooling circuit.

5. The machine cooling circuit according to claim 1, wherein the machine cooling circuit is integrated into an overall cooling circuit of the motor vehicle in the form of a cooling circuit, through which flow can independently take place.

6. The machine cooling circuit according to claim 1, wherein the coolant is a dielectric fluid.

7. An overall cooling circuit of a motor vehicle comprising:
the machine cooling circuit according to claim 1, which includes:
a first cooling circuit for cooling at least one pulse inverter; and
the transmission cooling circuit for cooling a transmission of the motor vehicle.

8. The overall cooling circuit according to claim 7, wherein flow can take place through the first cooling circuit, the transmission cooling circuit, and the machine cooling circuit separately from one another.

9. The overall cooling circuit according to claim 7, wherein the first cooling circuit is thermally coupled to the transmission cooling circuit with aid of a heat exchanger of the overall cooling circuit.

10. The overall cooling circuit according to claim 9, wherein the machine cooling circuit is thermally coupled to the first cooling circuit with aid of a further heat exchanger of the overall cooling circuit.

11. A motor vehicle, comprising:
an electric machine for propulsion; and
the overall cooling circuit according to claim 7.

12. The machine cooling circuit according to claim 1, wherein the compensating reservoir is force-loaded or pressure-loaded by a spring element configured to exert a force on the coolant.

13. The machine cooling circuit according to claim 12, wherein the force exerted on the coolant is configured to be continuously applied in the machine cooling circuit.

14. The machine cooling circuit according to claim 13, wherein the compensating reservoir is arranged at a greater distance from heat sources within the vehicle than another component of the machine cooling circuit so as to inhibit microbubble formation within the coolant.

15. The machine cooling circuit according to claim 1, further comprising a pump configured to convey the coolant through the machine cooling circuit, wherein the compensating reservoir is arranged in an inlet of the pump to inhibit cavitation within the coolant.

16. The machine cooling circuit according to claim 1, wherein the microbubble separator is arranged between the electric machine and the compensating reservoir.

* * * * *